Oct. 22, 1940.  B. W. JONES  2,218,754
ENGINE STARTER DRIVE
Filed Feb. 1, 1938   2 Sheets-Sheet 1
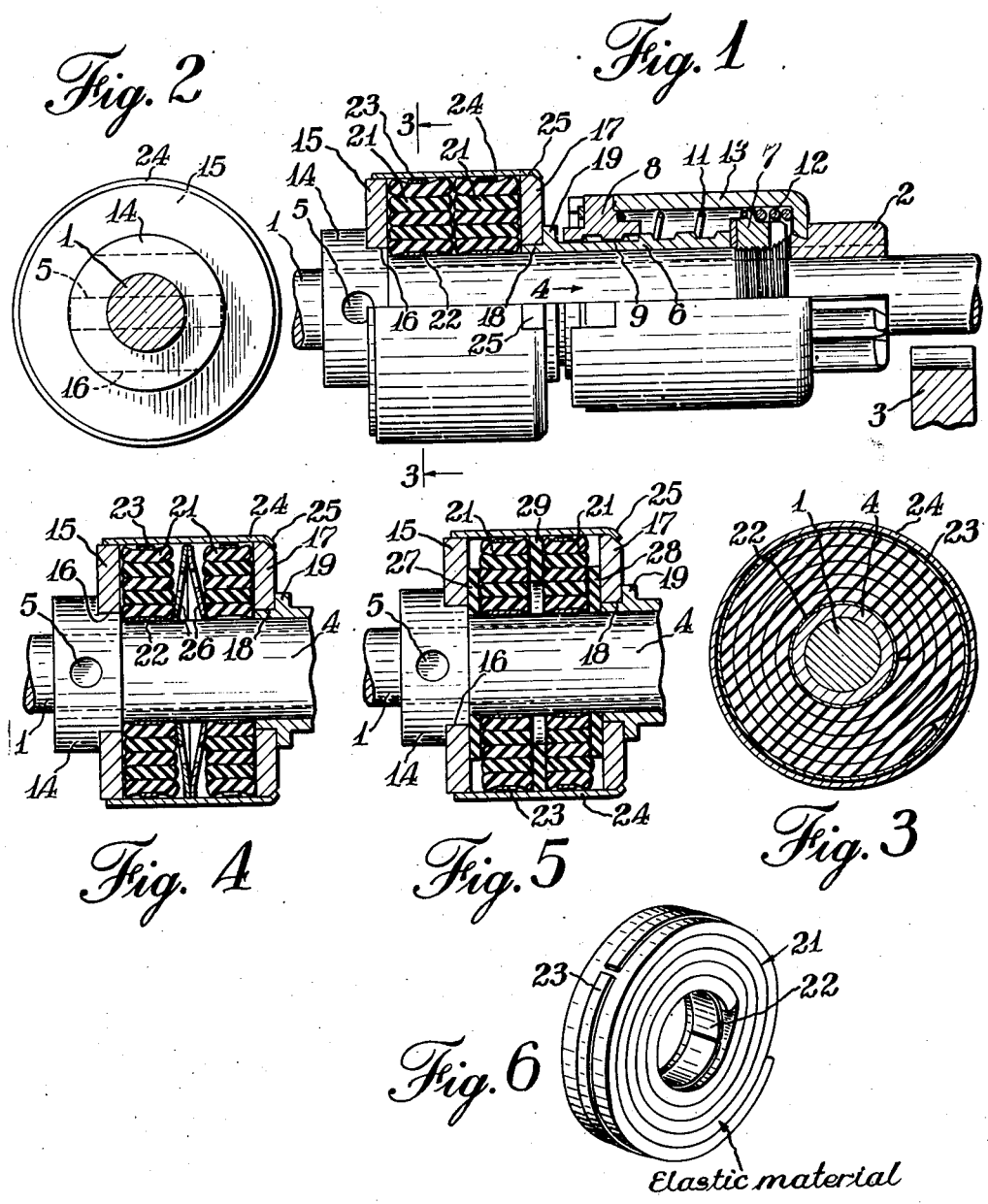
INVENTOR.
Burr W. Jones
BY Oct. 22, 1940. B. W. JONES 2,218,754
ENGINE STARTER DRIVE
Filed Feb. 1, 1938   2 Sheets-Sheet 2
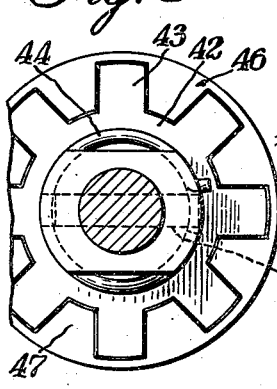
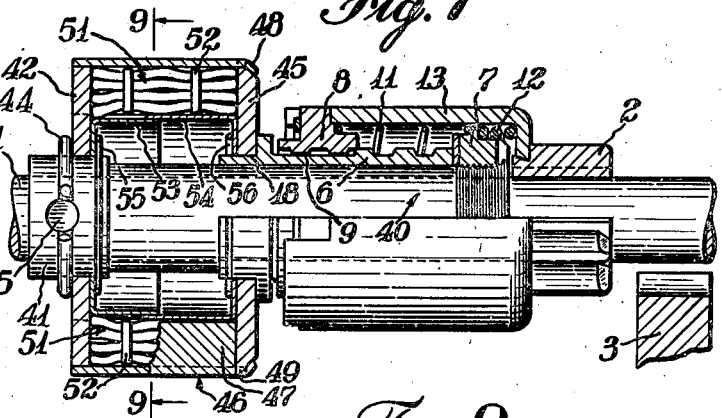
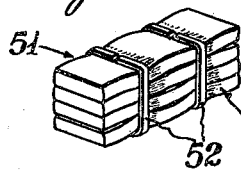
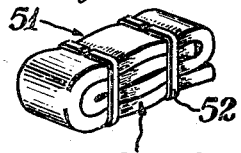
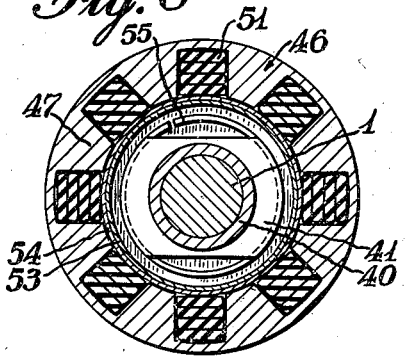
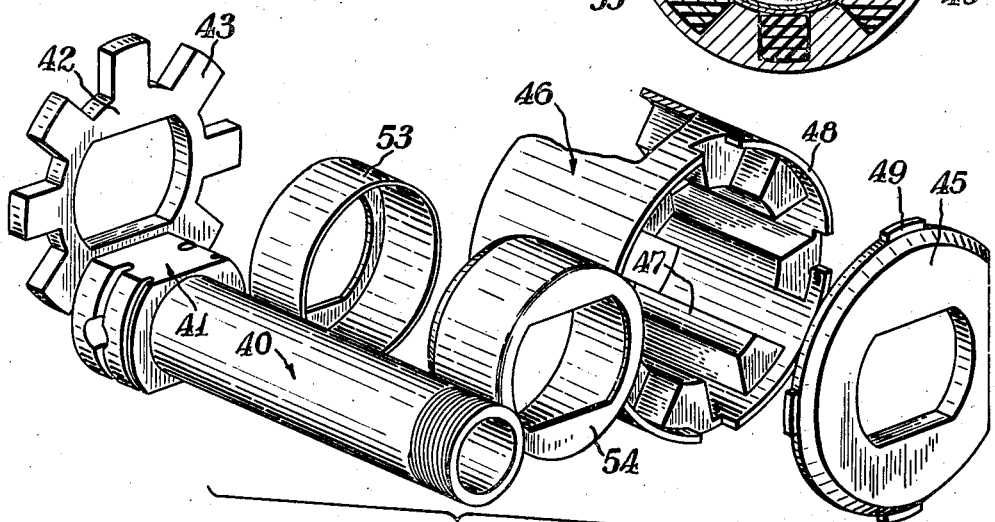
INVENTOR.
BY Burr W. Jones
ATTORNEY.

Patented Oct. 22, 1940

2,218,754

UNITED STATES PATENT OFFICE 2,218,754

ENGINE STARTER DRIVE

Burr W. Jones, Elmira, N. Y., assignor, by mesne assignments, to Bendix Aviation Corporation, South Bend, Ind., a corporation of Delaware Application February 1, 1938, Serial No. 188,105

4 Claims. (Cl. 74—7)

The present invention relates to engine starter drives and more particularly to yielding driving means for connecting a starting motor to a member of an engine to be started.

It is an object of the present invention to provide a novel yielding drive for engine starters employing units of elastically deformable material such as rubber.

It is another object to provide such a device in which the deformable material is in the form of strips stacked, rolled or folded into units which are readily interchangeable and replaceable for service purposes and to vary the characteristics of the drive.

It is a further object to provide such a device in which the transmission of forces through the deformable material is from edge to edge of said strips.

It is another object to provide such a device in which the units are subjected to pressure in accordance with the load transmitted.

It is a further object to provide such a device in which the units are arranged to transmit both pressure and torque.

Further objects and advantages will be apparent from the following description taken in connection with the accompanying drawings in which:

Fig. 1 is a side elevation partly in section of a preferred embodiment of the invention;

Fig. 2 is an end view thereof;

Fig. 3 is a section taken substantially on the line 3—3 of Fig. 1;

Fig. 4 is a detail partly in longitudinal section showing a modified form of the yielding driving connection;

Fig. 5 is a view similar to Fig. 4 showing a further modification thereof;

Fig. 6 is a detail in perspective of an elastically deformable unit;

Fig. 7 is a view similar to Fig. 1 showing another embodiment of the invention;

Fig. 8 is an end view thereof;

Fig. 9 is a section taken substantially on the line 9—9 of Fig. 7;

Fig. 10 is a detail in perspective showing an elastically deformable unit as used in Fig. 7;

Fig. 11 is a similar view of a modified form of elastic unit; and

Fig. 12 is a perspective detail of certain of the elements of the coupling illustrated in Fig. 7, shown in disassembled relation.

In Fig. 1 of the drawings, there is illustrated a power shaft 1 which may be the extended armature shaft of the starting motor, not shown, on which is slidably and rotatably mounted an engine driving member in the form of a pinion 2 movable thereon into and out of engagement with a member such as a ring gear 3 of an engine to be started.

Means for actuating the pinion 2 from the power shaft 1 is provided including a hollow shaft 4 rigidly connected to the power shaft 1 as by means of a pin 5, having a screw shaft 6 loosely mounted thereon and retained by means of a stop nut 7. Rotation of the screw shaft 6 is caused to actuate the pinion 2 by means of a nut 8 normally maintained on a smooth portion 9 of the screw shaft by means of an anti-drift spring 11 but caused to engage the threads of the screw shaft by a reentry spring 12. The nut 8 is connected to the pinion 2 by means of a barrel member 13 whereby longitudinal movement of the nut 8 on the screw shaft causes the pinion 2 to mesh with the ring gear 3 until the nut 8 engages the stop nut 7, after which rotation of the nut 8 is transmitted to the pinion to rotate the ring gear 3.

According to the present invention, a yielding driving connection is provided between the hollow shaft 4 and screw shaft 6 embodying a novel form of elastically deformable units. As here illustrated, the hollow shaft 4 is provided with a driving head 14 on which is non-rotatably mounted a driving flange 15 as by means of cooperating "double-D" sections 16. A driven flange 17 is similarly mounted on a "double-D" section 18 on the end of the screw shaft 6 in abutting relation with a flange 19 thereon.

Annular units 21 formed by rolling up strips of elastically deformable material such as sheet rubber are interposed between the driving and driven flanges 15, 17 with their edges in frictional engagement therewith and maintained under initial compression by the stop nut 7.

The elastic units 21 are preferably rolled under some initial pressure, and are confined on a core member 22 by suitable means such as a peripheral band 23. The units 21 are preferably enclosed by a cylindrical casing member 24 attached in any suitable manner to the driven flange 17 as indicated at 25.

In the operation of this embodiment of the invention, rotation of the power shaft 1 is transmitted through the driving head 14 of the hollow shaft 4 to the driving flange 15, which rotation is frictionally transmitted through the elastic units 21 to the driven flange 17 whereby the screw shaft 6 is rotated to advance the pinion 2 into mesh with the engine gear 3. When the nut 8 abuts against the stop nut 7, the meshing movement of the pinion is arrested and further rotation of the screw shaft 6 causes it to be screwed backward through the nut 8, thus compressing the elastic units 21 until the torque frictionally transmitted therethrough builds up sufficiently to cause rotation of the engine ring gear 3.

When the engine starts, the acceleration of the ring gear causes the parts to be returned to their idle positions.

It will be understood that the elasticity of the drive secured by means of the units 21 is a result both of the compression of said units and the distortion thereof due to the torque frictionally transmitted from one edge to the other thereof. The compression of the units is limited by the free space within the casing member 24, and may be varied in order to secure any desired mode of operation of the device.

Thus, in Fig. 4 there is illustrated a means for increasing the compressive elasticity of the coupling by the interposition of spring discs 26 between the elastic units 21, yieldably spacing said units and maintaining the inner convolutions thereof under initial compression while permitting additional compression of the coupling during the building up of the torque therein.

In Fig. 5 a somewhat similar result is secured by the interposition of spacing rings 27 and 28 between the elastic units 21 and the driving and driven discs 15 and 17 respectively, and a spacing ring 29 between the units 21. As here illustrated, the spacing rings 27 and 28 bear on the hollow shaft 4 but do not extend to the inner periphery of the casing member 24, while the central spacing ring 29 fits slidably in the casing member 24 but is of larger internal diameter than the hollow shaft 4. This arrangement provides additional space for the elastic units 21 when they are subjected to compression, whereby the elasticity of the coupling is increased.

The remaining parts illustrated in Figs. 4 and 5 are the same as shown in Fig. 1, and the operation of the device is the same except for the additional elasticity of the coupling provided by the features incorporated for that purpose.

In the embodiment of the invention illustrated in Figs. 7 to 12, a yielding driving connection is incorporated which employs elastic units formed of strips of rubber or the like which are stacked or folded into rectangular form and are utilized to cushion the transmission of torque by endwise compression. As there illustrated, the hollow shaft 40 is provided with a driving head 41 of "double-D" section on which is non-rotatably mounted a driving member 42 having radial arms 43 and retained on the driving head by means of a split ring 44. A driven flange member 45 is non-rotatably mounted on the "double-D" section 18 of the screw shaft 6, and a transmission member 46 in the form of a barrel having inwardly extending longitudinal ribs 47 is rigidly connected to the driven member 45 as by means of inturned flanges 48 on the barrel engaging the periphery of the driven member 45 and cooperating with radially extending lugs 49 on the driven member.

Elastically deformable units 51 are located in the spaces between the ribs 47 of barrel 46, loosely fitting said spaces and abutting against the driven flange member 45 at one end and the driving member 42 at the other end, which driving member is maintained in the end of the barrel 46 with its radial arms 43 in the spaces between the ribs 47, and in abutting relation with the units 51. As shown in Figs. 7 and 10, these elastic units are formed of strips of material such as sheet rubber which are stacked and unified by suitable means such as metallic bands 52. These units may also be formed by folding a strip of such material as illustrated in Fig. 11.

The units 51 are confined in the barrel by means of a pair of telescoping bushing members 53 and 54 non-rotatably mounted on the driving head 41 and on the "double-D" section 18 of the screw shaft 6 respectively, and maintained thereon by suitable means such as locking rings 55 and 56 respectively.

In the operation of this embodiment of the invention, rotation of the power shaft 1 is transmitted through the driving head 41 to the driving member 42 which causes rotation of the barrel member 46 by reason of the engagement of the radial arms 43 between the ribs 47 thereof. This rotation is transmitted through lugs 49 to the driven member 45, thus causing rotation of the screw shaft 6 which causes meshing of the pinion 2 in the manner previously described. When the nut 8 strikes the stop nut 7, further rotation of the screw shaft causes longitudinal movement thereof to the left in Fig. 7, which longitudinal movement is yieldingly resisted by the elastic units 51 whereby the transmission of torque through the coupling is cushioned and rendered elastic.

Although certain embodiments of the invention have been shown and described in detail, it will be understood that other embodiments are possible and various changes may be made in the design and arrangements of the parts without departing from the spirit of the invention as defined in the claims appended hereto.

What is claimed is:

1. In an engine starter drive, a power member, an engine driving member movable into and out of engagement with a member of the engine to be started, and a yielding driving connection therebetween including a laminated unit of elastically deformable sheet material having a high coefficient of friction, means for placing the unit under initial compression, driving and driven means frictionally engaging the edges of said material, torque-responsive means for compressing said unit edgewise of the laminations between the driving and driven members to cause progressive engagement of said edges until a full surface contact of the unit with the driving and driven members is secured, and means for confining said unit to limit its lateral deflection under load.

2. In an engine starter drive, a power shaft, an engine driving member movable thereon into and out of engagement with a member of the engine to be started, and a yielding driving connection therebetween including a driving element and a unit built up of layers of elastically deformable strip material, the edges of said layers frictionally engaging the driving and driven elements and constituting the sole driving connection therebetween, and means responsive to the torque transmitted therethrough for compressing said unit edgewise of the layers between the driving and driven elements to progressively build up surface contact between the unit and the driving and driven elements.

3. In an engine starter drive, a power shaft, an engine driving member movable thereon into and out of engagement with a member of the engine to be started, and a yielding driving connection therebetween including a driving element and a unit formed as a roll of elastically deformable strip material interposed between the driving and driven elements, said roll having flat sides in frictional engagement therewith and constituting the sole driving connection therebetween, yielding means for progressively building up the surface engagement of the roll, torque-responsive means for compressing the roll edgewise of its convolutions between the driving and driven elements, and means for limiting the radial expansion of the unit.

4. In an engine starter drive, a power shaft, a pinion movable thereon into and out of engagement with a member of an engine to be started, and a driving connection between the shaft and pinion including a driving element, a driven element slidably but non-rotatably connected thereto, a plurality of laminated blocks built up of elastically deformable strip material interposed between said driving and driven elements, means responsive to the load transmitted therethrough for compressing the blocks edgewise of said strips between the driving and driven elements and yielding discs cooperating with the edges of the blocks to progressively build up a compressive and torque-transmitting connection therethrough.

BURR W. JONES.